Patented July 14, 1931

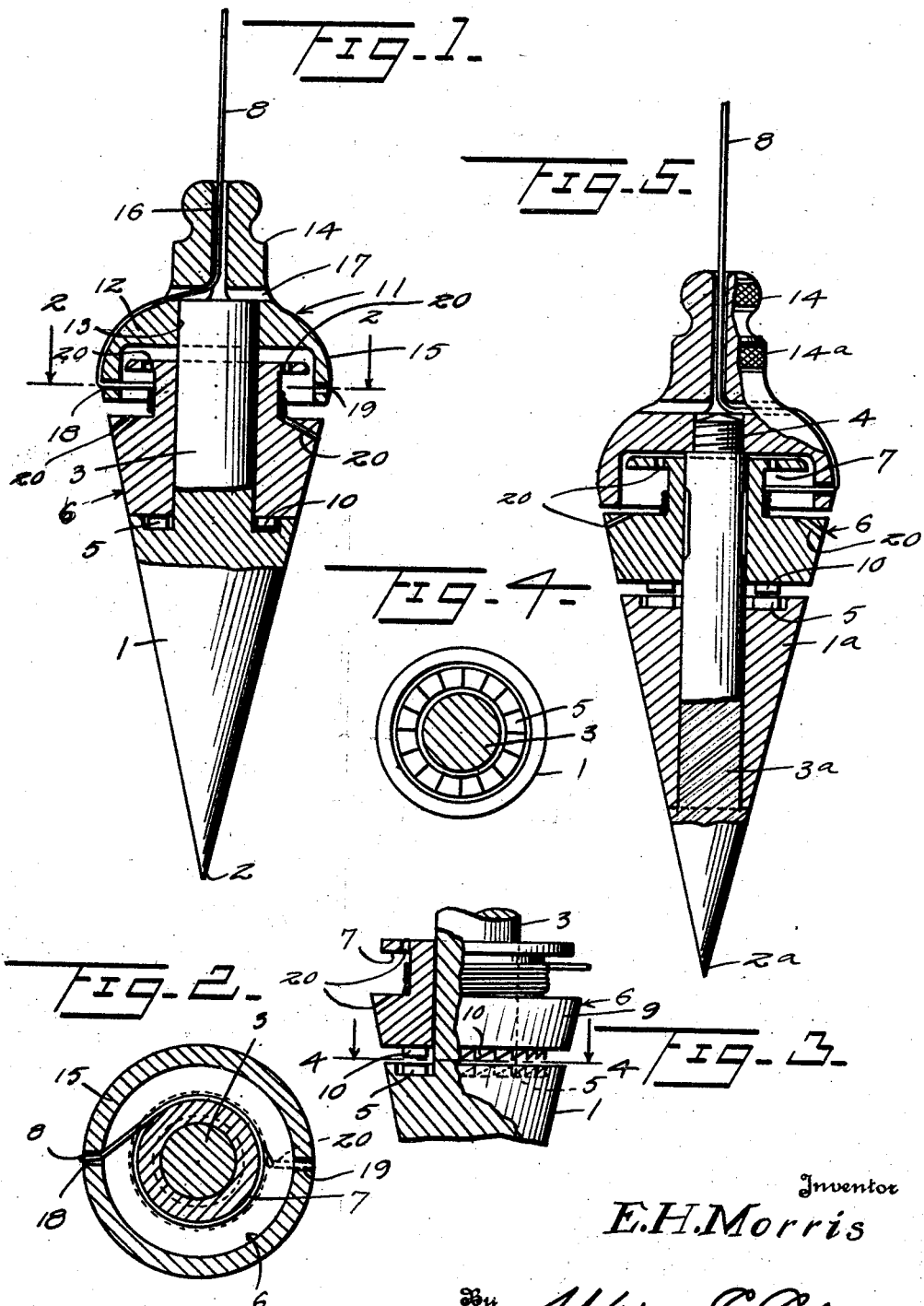

1,814,484

UNITED STATES PATENT OFFICE

EARL H. MORRIS, OF PADUCAH, KENTUCKY

PLUMMET

Application filed February 15, 1930. Serial No. 428,769.

This invention relates to plummets of that type suspended by a plumb line and embodying means through the medium of which the effective length of the plumb line may be varied to support the plummet at the desired elevation.

The invention has for one of its objects to provide a device of the character stated wherein the plumb line varying means shall consist of a spool on which the line is normally wound, wherein the plummet and spool shall be so associated as to permit the line to be unwound from or wound upon the spool as the result of the rotation of the plummet, and wherein the plummet and spool shall embody interlocking elements normally holding the former against rotation with respect to the latter so as to prevent the accidental unwinding of the line and thus insure the suspension of the plummet at the desired elevation.

The invention has for a further object to provide a device of the character stated wherein the plummet and spool shall be so associated as to permit the plummet to move downwardly with respect to the spool when the spool is held in the hand, whereby to free the plummet from engagement with the spool and thus permit it to turn and unwind enough of the plumb line to support it at the desired elevation.

The invention has for a further object to provide a device of the character stated wherein the plummet and spool shall be so associated as to permit the spool, on being released, to move downwardly with respect to the plummet, whereby to establish an interlocking connection between them and as the result support the plummet at the desired elevation.

The invention has for a further object to provide a device of the character stated wherein the inert gravity of the plummet is employed to effect its disengagement from the spool when it is desired to unwind a length of the plumb line from the spool and wherein the inert gravity of the spool is employed to effect its engagement with the plummet when it is desired to check the unwinding of the line and thus suspend the plummet at the desired elevation.

The invention has for a further object to provide a device of the character stated which shall embody a member having a fixed position with respect to the plummet and adapted to insure the uniform winding of the plumb line on the spool and adapted to insure the free unwinding of the line from the spool.

The invention has for a further object to provide a device of the character stated wherein the plummet, spool and plumb line winding and guiding member shall be so related as to permit free access to the spool from the exterior of the parts to the end that a new plumb line may be readily passed through the winding and guiding member and attached to and wound upon the spool.

The invention has for a further object to provide a device of the character stated wherein the plummet, spool and winding and guiding member shall be symmetrical with respect to their own vertical axes and so related that such axes will coincide, to the end that a true balance of the plummet may be obtained.

The invention has for a still further object to provide a device of the character stated wherein the plumb line shall be adapted to be wound upon and unwound from the spool with the minimum of friction, to the end that abrasion of the plumb line will be reduced to the minimum and the free and easy movement thereof insured.

These and other objects are attained by the construction shown in the accompanying drawings, wherein for the purpose of illustration are shown preferred embodiments and wherein:—

Figure 1 is a sectional view taken on a plane extending vertically and centrally through a plummet constructed in accordance with my invention, the body of the plummet and spool being shown in interlocking engagement;

Figure 2 is a sectional view taken on the horizontal plane indicated by the line 2—2 of Figure 1;

Figure 3 is a view partly in elevation and partly in vertical section of a portion of the plummet with the body and spool out of interlocking engagement;

Figure 4 is a sectional view taken on the horizontal plane indicated by the line 4—4 of Figure 3, and Figure 5 is a view partly in vertical section and partly in elevation of a slightly modified form of the plummet.

Referring in detail to the drawings, and particularly to Figures 1 to 4, 1 designates the plummet and 2 the indicating point of the plummet. The plummet 1 is provided at its upper end with a spindle 3 which is arranged with its axis coinciding with the axis of the plummet. The plummet 1 is provided at its upper side with an annular series of locking elements or teeth 5 which surround the spindle 3 and are arranged concentrically with respect to the axis of the plummet and spindle and extend upwardly from the upper side of the plummet body member 1.

A spool 6 is mounted upon the spindle 3, and its axis coincides with the axis of the plummet 1 and spindle. The spool 6 is provided in the upper portion of its lateral surface with an annular groove 7 for the reception of the plumb line 8, and it is provided below the groove with a downwardly tapering or conical grip 9. The spool 6 is provided at its lower end with locking elements or teeth 10 which are adapted to engage the teeth 5 to normally hold the body 1 against rotation with respect to the spool.

A plumb line winding and guiding member 11 is fixed to the spindle 3, and it comprises a circular base 12 provided with a central opening 13 for the reception of the upper end of the spindle, a substantially cylindrical stem 14 extending upwardly from the base and located above the spindle with its axis coinciding with the axis of the plummet 1 and spindle, and an annular flange 15 extending downwardly from the base and surrounding the upper portion of the groove 7 of the spool 6.

The stem 14 is provided with an axial passage 16 which extends from the upper end thereof to a passage 17 extending diametrically through the lower end of the stem. The flange 15 is provided near its lower edge with diametrically opposed radial openings 18 and 19. The plumb line 8 which extends through the passages 16 and 17 and opening 18 is wound about the spool 6 and is suitably secured to the spool. The spool 6 may be provided at opposite sides of its axis with openings 20, in either of which an end of the plumb line may be secured. The plumb line 8 may be secured to the spool 6 in any other manner desired. That portion of the plumb line 8 that is located between the passage 17 and the opening 18 contacts with the outer lateral surfaces of the base 12 and flange 15 and such surfaces are spherical to prevent abrasion of the plumb line. The lower end of the passage 16 is rounded also to prevent abrasion of the plumb line 8.

The passage 17 is extended diametrically through the stem 14, and the flange 15 is provided with an opening 19 diametrically opposite the opening 18 to effect a perfect balance of the winding and guiding member 11, and to permit the plumb line 8 to be changed from side to side of the winding and guiding member occasionally so as to produce equal wear on each side of said member and thus insure its true balance being maintained for a long time under continued use. The base 12 is spaced sufficiently from the upper end of the plummet 1 to permit the plummet to move downwardly with respect to the spool 6 when the spool is held in the hand, such movement of the plummet carrying the teeth 5 out of engagement with the teeth 10, and as the result, freeing the plummet and winding and guiding member 11 for rotation with respect to the spool.

The point 2 and spindle 3 may be formed integrally with the plummet 1, as shown in Figure 1, or if desired, the point and spindle may be formed integrally and separately from the plummet, as shown in Figure 5. In this figure, 2a designates the point, 3a the spindle and 1a the plummet. The spindle 3a passes centrally through the plummet 1a, and the plummet 1a may be fixed to the spindle in any suitable manner. The winding and guiding member 11 may be screw threadedly engaged with the spindle, as shown at 4 in Figure 5, or it may be secured thereto in any other suitable manner.

In practice, the plummet 1 is suspended through the medium of the plumb line 8, more or less of the plumb line is wound on the spool 6, and the teeth 5 and 10 are in engagement to hold the plummet and winding and guiding member 11 against rotation with respect to the spool. When it is desired to lower the plummet 1 from the position in which it is suspended by the plumb line 8, the spool 6 is grasped and moved upwardly to carry its teeth 10 out of engagement with the teeth 5, and thus free the plummet 1 and winding and guiding member 11 for rotation with respect to the spool. The plummet 1 is now lowered through the medium of the spool 6 which is held against rotation. While the plummet 1 is being lowered, the downward movement thereof is slightly retarded by the frictional contact between the unwinding plumb line 8 and the walls of the openings of the winding and guiding member 11, and due thereto rotary motion is imparted to the plummet and said member, the rotation of such parts unwinding the plumb line 8 from the spool 6. When the plummet 1 has been lowered to the desired point, the spool 6 is released, with the result that the spool moves downwardly and carries its teeth 10 into engagement with the teeth 5. The engagement between the teeth 5 and 10 holds the plummet 1 and winding and guiding member 11 against rotation with respect to the spool 6.

The plumb line 8 is now held against unwinding from the spool 6, with the result that the plummet is held at the desired elevation. When it is desired to rewind the plumb line 8 upon the spool 6, the plummet is supported from the spool to free the plummet 1 and guiding and winding member 11 from engagement with the spool, and thereafter the plummet and winding and guiding member are turned with respect to the spool, the turning of these parts uniformly winding the plumb line on the spool. To facilitate the turning of these parts, the stem 14 is provided with knurled portions 14a. The diameter of the bore of the spool 6 is slightly larger than that of the spindle 3 so as to permit the plummet 1 and winding and guiding member 11 to rotate freely with respect to the spool during the winding of the plumb line 8 upon or the unwinding of the same from the spool. The teeth 5 and 10 are of such formation that when in engagement they hold the plummet against turning movement with respect to the spool 6 in a direction to unwind the plumb line and permit the plummet to be turned in a direction to wind the plumb line on the spool.

While I have described the principle of the invention, together with the device which I now consider the preferred embodiment thereof, it is to be understood that the device shown is merely illustrative and that such changes may be made, when desired, as fall within the scope of the invention as claimed.

I claim:—

1. In combination, a plummet, a spool, a plumb line wound on the spool, a spindle connecting the plummet and spool to permit the plummet to move downwardly and rotate with respect to the spool when suspended by the spool, and interlocking elements carried by the plummet and spool and adapted to engage each other when the plummet is suspended by the plumb line to hold the plummet against rotation with respect to the spool.

2. In combination, a plummet, a spool, a plumb line wound on the spool, a spindle connecting the plummet and spool to permit the plummet to move downwardly and rotate with respect to the spool when suspended by the spool, interlocking elements carried by the plummet and spool and adapted to engage each other when the plummet is suspended by the plumb line to hold the plummet against rotation with respect to the spool, and a winding and guiding member for the plumb line secured to the spindle.

3. In combination, a plummet, a spool, a plumb line wound on the spool, a spindle connecting the plummet and spool to permit the plummet to move downwardly and rotate with respect to the spool when suspended by the spool, interlocking elements carried by the plummet and spool and adapted to engage each other when the plummet is suspended by the plumb line to hold the plummet against rotation with respect to the spool, and a winding and guiding member for the plumb line secured to the spindle, said member having a circular base secured to the spindle, a stem extending upwardly from the base, and an annular flange depending from the base and surrounding the spool, the stem being provided with axial and diametrical passages and the flange being provided with a radial opening for the reception of the plumb line.

4. In combination, a plummet, a point therefor, a spindle carrying the point and extending axially through the plummet, a spool mounted upon the spindle and permitting the plummet to move downwardly and rotate with respect to the spool when suspended by the spool, and interlocking elements carried by the opposing ends of the plummet and spool and adapted to hold the plummet against turning with respect to the spool when suspended by the plumb line.

5. In combination, a plummet, a winding and guiding member fixed to the plummet and having passages therethrough, a spool, a plumb line passing through said passages and wound on the spool, means connecting the plummet and spool so that the plummet and said member may move downwardly and rotate with respect to the spool when suspended by the spool and so that the spool may move downwardly with respect to the plummet and said member when suspended by the line, and means holding the plummet and said member against turning movement with respect to the spool only when suspended by the line.

In testimony whereof I hereunto affix my signature.

EARL H. MORRIS.